United States Patent Office 2,926,086
Patented Feb. 23, 1960

2,926,086

STABILIZATION OF NON-DISTILLED ALCOHOLIC BEVERAGES AND THE RESULTING PRODUCT

Joseph A. Chenicek, Prairie View, and William K. T. Gleim, Island Lake, Ill., assignors, by mesne assignments, to Universal Oil Products Company, Des Plaines, Ill., a corporation of Delaware No Drawing. Application July 30, 1957
Serial No. 675,025

10 Claims. (Cl. 99—48)

This application is a continuation-in-part of our copending application Serial No. 276,701, filed March 14, 1952, now abandoned, and relates to the stabilization of non-distilled alcoholic beverages and more particularly to a novel method of preventing haze therein.

One way in which a consumer evaluates a beverage is by holding a bottle or glass thereof to the light and looking through the beverage. If it is sparkling and clear, the consumer is favorably impressed, whereas if it is cloudy or hazy the consumer is unfavorably impressed. Furthermore, the factor of a clear beverage is an important sales argument by the manufacturer and retailer. Still further, the effect of hazing on the taste and also odor of the beverage has not been completely determined at the present time. However, while the haze in itself may not affect the taste or odor, side reactions occurring during haze formation may result in secondary reaction products which do affect the taste and/or odor of the beverage.

The novel method of the present invention is particularly applicable to the stabilization of non-distilled alcoholic beverages, including beer, ale, wines, champagne, etc., and preferably to the stabilization of malt fermented beverages including beer, ale, etc., and more particularly to the stabilization of beer. In the interest of simplicity, the following description will be directed primarily to the stabilization of beer, with the understanding that it is applicable to other beverages.

Hazing of beer, also referred to as turbidity or as "chill haze," is generally acccepted as a criterion of the stability of the beer because any loss in colloidal stability usually is first evidenced as a chill haze. The chill haze appears when the beer is cooled to 50° F. or below and hazing also appears upon long storage of the beer at ordinary temperatures. One method of preventing haze has been by filtering the beer through a suitable adsorbent, such as alumina, activated carbon, bentonite, etc., but the objection to this method of treatment is the risk of removing proteinaceous substances and thereby injuring the body or palatability of the beer as well as its foam-forming and foam-retaining properties. In another method of preventing haze, certain reducing agents have been incorporated in the beer including sodium bisulfite, potassium metabisulfite, etc. However, with some of these additives, as for example, potassium metabisulfite, it has been found that considerable quantities are required to obtain a pronounced effect and that these quantities are in excess of those which can be employed in beer for various reasons. Large quantities of these additives detrimentally affect the odor and taste of the beer. Furthermore, in a number of countries, there are legal restrictions which prevent the use of sulfites for this purpose.

One theory has been suggested that hazing in beer is enhanced or caused by the metal constituents present in minute quantities in the beer. As will be seen from the appended examples, the novel method of the present invention was very effective in retarding hazing of beer containing iron and copper ions.

In one embodiment the present invention relates to the method of stabilizing a non-distilled alcoholic beverage which comprises incorporating therein an alkylene polyamine polyalkanoic acid.

In a specific embodiment the present invention relates to a method of preventing hazing of beer containing metallic ions, which comprises incorporating in the beer from about 0.00001% to about 0.005% by weight of ethylene diamine tetra-acetic acid.

In accordance with the present invention, hazing of beverages is prevented by incorporating therein an alkylene polyamine polyalkanoic acid. Any suitable alkylene polyamine polyalkanoic acid may be employed. A particularly preferred compound comprises ethylene diamine tetra-acetic acid. Other suitable but not necessarily equivalent compounds include methylene diamine tetra-acetic acid, methylene diamine tetra-propionic acid, methylene diamine tetra-butyric acid, methylene diamine tetra-valeric acid, etc., ethylene diamine tetra-propionic acid, ethylene diamine tetra-butyric acid, ethylene diamine tetra-valeric acid, etc., propylene diamine tetra-acetic acid, propylene diamine tetra-propionic acid, propylene diamine tetra-butyric acid, propylene diamine tetra-valeric acid, etc., butylene diamine tetra-acetic acid, butylene diamine tetra-propionic acid, butylene diamine tetra-butyric acid, butylene diamine tetra-valeric acid, etc., amylene diamine tetra-acetic acid, amylene diamine tetra-propionic acid, amylene diamine tetra-butyric acid, amylene diamine tetra-valeric acid, etc., hexylene diamine tetra-acetic acid, hexylene diamine tetra-propionic acid, hexylene diamine tetra-butyric acid, hexylene diamine tetra-valeric acid, etc., diethylene triamine tetra-acetic acid, etc., dipropylene triamine tetra-acetic acid, etc., diethylene triamine penta-acetic acid, etc. With the tetra alkanoic acids, it generally is preferred that the alkanoic group contains from one to about five carbon atoms per group, although it is understood that larger size groups may be employed. Similarly, it generally is preferred that the alkylene polyamine grouping contains from one to about eight carbon atoms, although it is understood that this group may contain a larger number of carbon atoms when desired. Although not necessarily with equivalent results, compounds containing 1, 2 or 3 alkanoic groups may be employed and the alkanoic groups need not necessarily contain the same number of carbon atoms per group.

The alkylene polyamine polyalkanoic acid may be incorporated in the beverage in any satisfactory amount to effect the desired stabilization. In general the quantity utilized will be below about 1% by weight of the beverage and usually will be in a concentration of from about 0.00001% to about 0.1% by weight. In some cases the use of concentrations of about 0.01% and higher may result in a slight taste effect and, in such cases, it is preferred that the compound of the present invention be incorporated in the beverage in a concentration of from about 0.00001% to about 0.008% by weight.

The compound of the present invention may be used in beverages along with other additives incorporated for specific purposes. For example, in some cases, an antioxidant, metal deactivator, surface active agent, other additives, or mixtures thereof are incorporated in the beverage. When desired, the compound of the present invention may be commingled with the other additive or additives, and the mixture incorporated in the beverage, or each may be added to the beverage separately. In some cases it may be desired to include two or more different antioxidants, two or more different metal deactivators or two or more surface active agents in the beverage.

Various methods have been proposed for evaluating the hazing of beer. The intensity of light passing through the beverage may be measured by precise instruments which are available. Other instruments are used for determining the intensity of the Tyndall effect. However, these mechanical means do not account for the differences in varying light sources, etc. which are encountered when the consumer raises the beverage to the light as hereinbefore set forth. Therefore, it is considered that a preferred method of evaluating the clarity of beverages is by visual observation. These observations may be made after the beer has been subjected to accelerated aging, using controlled amounts of air, controlled agitation of the beverage, chilling and storing at controlled temperatures, etc. In general, these accelerated tests appear to correlate satisfactorily with results obtained by long time aging of the beverage under conditions selected to simulate those normally encountered in actual practice.

The following examples are introduced to illustrate further the novelty and utility of the present invention but not with the intention of unduly limiting the same.

*Example I*

As hereinbefore set forth, one theory has been suggested that hazing of beer is enhanced or caused by the metal constituents present in minute quantities in the beer. In order to verify that the additive of the present invention is effective in the presence of metal constituents, copper ions, in the form of copper acetate, and iron ions, in the form of ferrous lactate, were added in a concentration of one part per million of each.

The beer was stored for three months at 40° F. and, after this storage, the turbidity ratings were determined. Six series, each consisting of six bottles of the beer, were evaluated. The first two series consisted of the control runs and the beer in these series did not contain either metallic ions or the additive. The turbidity ratings of the beer after evaluation in the above manner averaged 4.9 and 5.3.

In the second two series, iron and copper ions were added to the beer in the manner hereinbefore set forth. These samples did not contain the additive. After storage in the manner above described, these series had average turbidity ratings of 27.0 and 31.4. It will be noted that the metallic ions caused considerable hazing of the beer.

In the third series, iron and copper ions were added in the manner hereinbefore described and ethylene diamine tetra-acetic acid was also added in a concentration of 0.01% by weight. After storage in the manner hereinbefore set forth, the beer in these series had average turbidity ratings of 4.9 and 5.7. It will be noted that the additive served to offset the deleterious effect of the metallic ions and retarded hazing of the beer.

*Example II*

The use of the alkylene polyamine polyalkanoic acid appears to be peculiarly unique for preventing hazing of beer. For example, generally the use of the tetrasodium salt of ethylene diamine tetra-acetic acid is equal or better than the use of ethylene diamine tetra-acetic acid for use as an additive in organic substrates. However, as will be shown by the data in this example, the tetrasodium salt of ethylene diamine tetra-acetic acid was not effective in preventing hazing of beer.

A series of four bottles of beer containing copper ions in a concentration of one part per million was evaluated in the manner described in Example I. The beer in these samples contained 0.01% by weight of the tetrasodium salt of ethylene diamine tetra-acetic acid. The average turbidity rating was 24.5. It will be recalled from Example I that the average turbidity rating of samples of the beer containing metallic ions was 27.0. On the other hand, the average turbidity ratings for the samples of beer containing ethylene diamine tetra-acetic acid were 4.9 and 5.7.

We claim as our invention:

1. The method of preventing hazing of a non-distilled alcoholic beverage which comprises incorporating therein an alkylene polyamine polyalkanoic acid.

2. A method of preventing hazing of a non-distilled alcoholic beverage which comprises incorporating therein ethylene diamine tetra-acetic acid.

3. The method of preventing hazing of beer which comprises incorporating therein an alkylene polyamine polyalkanoic acid.

4. The method of preventing hazing of beer containing metallic ions which comprises incorporating therein an alkylene polyamine tetra-acetic acid.

5. The method of preventing hazing of beer containing copper ions which comprises incorporating in the beer ethylene diamine tetra-acetic acid.

6. The method of preventing hazing of beer containing iron ions which comprises incorporating in the beer ethylene diamine tetra-acetic acid.

7. A non-distilled alcoholic beverage containing an added alkylene polyamine polyalkanoic acid in sufficient amount to stabilize the beverage against haze formation.

8. Beer containing an added alkylene polyamine polyalkanoic acid in sufficient amount to stabilize the beer against haze formation.

9. Beer containing metallic ions and an added alkylene polyamine tetra-acetic acid in sufficient amount to stabilize the beer against haze formation.

10. Beer containing metallic ions and ethylene diamine tetra-acetic acid in sufficient amount to stabilize the beer against haze formation.

References Cited in the file of this patent

UNITED STATES PATENTS

| | | |
|---|---|---|
| 2,428,353 | Bersworth | Oct. 7, 1947 |
| 2,461,519 | Bersworth | Feb. 15, 1949 |
| 2,500,019 | Bersworth | Mar. 7, 1950 |
| 2,711,963 | Gray | June 28, 1955 |
| 2,748,002 | Kneen | May 29, 1956 |

FOREIGN PATENTS

| | | |
|---|---|---|
| 262,670 | Switzerland | Oct. 1, 1949 |

OTHER REFERENCES

Western Food Industries, July 1949, Pacific Coast Edition, Food Industries, p. W. 70, vol. 21, No. 7 (abstract 106 "Sequestrene" A New Agent for Clarifying Wines, Jack K. Krum, Food Technology Dept., University of Mass., Amherst).

"Biochemistry Applied to Malting and Brewing," by Hopkins et al., George Allen and Unwin Ltd., Museum Street, London, 1937, pp. 315 and 316.